(12) United States Patent
Jin et al.

(10) Patent No.: US 11,481,958 B2
(45) Date of Patent: Oct. 25, 2022

(54) ROOT IMAGING DEVICE

(71) Applicant: Purdue Research Foundation, West Lafayette, IN (US)

(72) Inventors: Jian Jin, West Lafayette, IN (US); Wei Qiu, Nanjing (CN); Zhihang Song, West Lafayette, IN (US); Liangju Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 133 days.

(21) Appl. No.: 16/923,045

(22) Filed: Jul. 7, 2020

(65) Prior Publication Data

US 2021/0005011 A1 Jan. 7, 2021

Related U.S. Application Data (60) Provisional application No. 62/871,176, filed on Jul. 7, 2019.

(51) Int. Cl.
*G06T 15/08* (2011.01)
*G06T 7/136* (2017.01)

(52) U.S. Cl.
CPC .............. *G06T 15/08* (2013.01); *G06T 7/136* (2017.01); *G06T 2207/20081* (2013.01); *G06T 2207/30188* (2013.01)

(58) Field of Classification Search
CPC .......... G06T 15/08; G06T 2207/10024; G06T 2207/10068; G06T 2207/20081; G06T 2207/20084; G06T 2207/30188; G06T 7/0004; G06T 7/11; G06T 7/136
See application file for complete search history.

(56) References Cited

U.S. PATENT DOCUMENTS

| | | | |
|---|---|---|---|
| 9,538,124 B2 * | 1/2017 | Lejeune | A01G 31/00 |
| 10,568,316 B2 * | 2/2020 | Gall | A01B 79/005 |
| 2007/0289211 A1 * | 12/2007 | Lejeune | A01G 31/00 47/65 |
| 2011/0048144 A1 * | 3/2011 | Zeleznik | A01G 7/06 73/866 |

(Continued)

OTHER PUBLICATIONS van Dusschoten, Dagmar, et al. "Quantitative 3D analysis of plant roots growing in soil using magnetic resonance imaging." Plant physiology 170.3 (2016): 1176-1188. (Year: 2016).*

(Continued)

*Primary Examiner* — Bobbak Safaipour
(74) *Attorney, Agent, or Firm* — Piroozi-IP, LLC (57) ABSTRACT

A root imaging system is disclosed which includes a robotic arm, a camera coupled to the robotic arm, the robotic arm configured to insert the camera into the soil at predefined coordinates, a processor system configured to receive user-defined data about a plant of interest, define insertion points about the plant of interest based on the user-defined data, control the robotic arm to thereby insert the camera into the soil at defined insertion points, obtain images from the camera positioned at the insertion points, analyze the images for presence of roots, and identify the images having roots and combine that with image 3D location information for 3D structure reconstruction of the entire root structure.

20 Claims, 9 Drawing Sheets
(5 of 9 Drawing Sheet(s) Filed in Color)

(56) References Cited

U.S. PATENT DOCUMENTS

| | | | | |
|---|---|---|---|---|
| 2013/0021469 | A1* | 1/2013 | Conrad | G06K 9/00 |
| | | | | 382/110 |
| 2013/0070081 | A1* | 3/2013 | Lejeune | A01G 7/00 |
| | | | | 348/89 |
| 2015/0015697 | A1* | 1/2015 | Redden | A01G 7/00 |
| | | | | 382/110 |
| 2017/0223947 | A1* | 8/2017 | Gall | A01B 79/005 |
| 2019/0150379 | A1* | 5/2019 | Cademartiri | C08B 37/006 |
| 2020/0167884 | A1* | 5/2020 | Salon | H04N 7/002 |
| 2020/0229357 | A1* | 7/2020 | Spiro | A01G 7/00 |
| 2021/0293767 | A1* | 9/2021 | Mei | G01N 33/0098 |

OTHER PUBLICATIONS

Cobb, et al., Next-generation phenotyping: Requirements and strategies for enhancing our understanding of genotype-phenotype relationships and its relevance to crop improvement. vol. 126, Theoretical and Applied Genetics. 2013. p. 867-87.
Yang et al., Plant phenomics and high-throughput phenotyping: Accelerating rice functional genomics using multidisciplinary technologies. vol. 16, Current Opinion in Plant Biology. 2013. p. 180-7.
Paez-Garcia et al., Root Traits and Phenotyping Strategies for Plant Improvement. Plants [Internet]. Jun. 15, 2015 [cited Jan. 7, 2020];4(2):334-55.
Zarebanadkouki et al., Estimation of the hydraulic conductivities of lupine roots by inverse modelling of high-resolution measurements of root water uptake Ann Bot [Internet]. Oct. 2016 [cited Jan. 7, 2020];118(4):853-64.
Uga et al., Control of root system architecture by Deeper Rooting 1 increases rice yield under drought conditions. Nat Genet. Sep. 2013;45(9):1097-102.
Hashiguchi et al., Mechanism of Higher Plant Gravity Sensing. Am J Bot [Internet], Jan. 2013 [cited Jan. 7, 2020];100(1):91-100.
Drew, Sensing soil oxygen. Plant, Cell Environ [Internet]. Sep. 1990 [cited Jan. 7, 2020];13(7):681-93.
Crook et al., Stem and Root Characteristics Associated with Lodging Resistance in Four Winter Wheat Cultivars. J Agric Sci 1994;123(2):167-74.
Ryan et al., Plant roots: Understanding structure and function in an ocean of complexity. Ann Bot. 2016;118(4):555-9.
Cheol et al., Root-mediated signal transmission of systemic acquired resistance against above-ground and below-ground pathogens. Ann Bot [Internet]. Oct. 2016 [cited Jan. 7, 2020];118(4):821-31.
De Baets et al., Root tensile strength and root distribution of typical Mediterranean plant species and their contribution to soil shear strength. Plant Soil. 2008;305(1-2):207-26.

Iyer-Pascuzzi et al., High-Throughput, Noninvasive Imaging of Root Systems. Methods Mol Biol [Internet]. 2013;959(2):247-64.
Clark et al., Three-dimensional root phenotyping with a novel imaging and software platform. Plant Physiol. 2011;156(2):455-65.
Amato et al., A high quality low-cost digital microscope minirhizotron system. Comput Electron Agric [Internet], 2012;80:50-3.
Pateña et al., Digital acquisition and measurement of peanut root minirhizotron images. Agron J. 2000;92(3):541-4.
Lu et al., Adaptive minirhizotron for pepper roots observation and its installation based on root system architecture traits. Plant Methods [Internet]. 2019;15(1):1-14.
Mairhofer et al., Recovering complete plant root system architectures from soil via X-ray μ-Computed Tomography. Plant Methods [Internet]. Mar. 20, 2013 [cited May 21, 2019];9(1):8.
Mooney et al.,Developing X-ray computed tomography to non-invasively image 3-D root systems architecture in soil. Vol. 352, Plant and Soil. 2012. p. 1-22.
Pflugfelder et al., Non-invasive imaging of plant roots in different soils using magnetic resonance imaging (MRI). Plant Methods. 2017;13:102.
Metzner et al., Direct comparison of MRI and X-ray CT technologies for 3D imaging of root systems in soil: potential and challenges for root trait quantification. Plant Methods [Internet]. 2015 [cited Nov. 18, 2019];11(1):17.
Zappala et al., Quantifying the effect of soil moisture content on segmenting root system architecture in X-ray computed tomography images. Plant Soil. Sep. 2013;370(1-2):35-45.
Ma et al., Removal of greenhouse microclimate heterogeneity with conveyor system for indoor phenotyping. Comput Electron Agric. Nov. 1, 2019;166:104979.
Tucker, Red and photographic infrared linear combinations for monitoring vegetation. Remote Sens Environ. 1979;8(2):127-50.
Szegedy et al., Rethinking the Inception Architecture for Computer Vision. In: Proceedings of the IEEE Computer Society Conference on Computer Vision and Pattern Recognition. IEEE Computer Society; 2016 p. 2818-26.
Paszke et al., Automatic differentiation in PyTorch. Oct. 2017.
Hund et al., Rooting depth and water use efficiency of tropical maize inbred lines, differing in drought tolerance. Plant Soil. May 2009;318(1-2):311-25.
Zhu et al., Root cortical aerenchyma improves the drought tolerance of maize (*Zea mays* L.). Plant Cell Environ [Internet]. Feb. 2010 [cited Jan. 8, 2020].
Ostertagová et al., Methodology and application of the Kruskal-Wallis test. Appl Meeh Mater. 2014;611:115-20.
Athmann et al., Root growth in biopores—evaluation with in situ endoscopy. Plant Soil. Mar. 2013;371:179-190.
Kauiz et al., In situ endoscopy: New insights to root growth in biopores, Plant Biosystems, Jun. 2010;144:2, 440-442.

* cited by examiner

ROOT IMAGING DEVICE

CROSS-REFERENCE TO RELATED APPLICATIONS

The present patent application is related to and claims the priority benefit of U.S. Provisional Patent Application Ser. No. 62/871,176, filed Jul. 7, 2019, the contents of which are hereby incorporated by reference in its entirety into the present disclosure.

STATEMENT REGARDING GOVERNMENT FUNDING

None.

TECHNICAL FIELD

The present disclosure generally relates to an imaging system, and in particular, to a system and method for imaging roots of a plant.

BACKGROUND

This section introduces aspects that may help facilitate a better understanding of the disclosure. Accordingly, these statements are to be read in this light and are not to be understood as admissions about what is or is not prior art.

Plant phenotyping technology has been playing an important role in assisting researchers studying the connections between plant phenotypes (i.e., observable traits or attributes of an organism) and genotypes (i.e., genes that define an organism, that can be inherited from a parent or passed on to an offspring). This technology can monitor the plant's physical growing condition, predict nutrient deficiencies, and detect plant diseases. Plant root is a type of organ that mostly grows in the soil, which works to acquire water and nutrients from the living environment, sense the environment, and forward sensing messages to the plant body. In addition, the root network is the base foundation that supports the above-ground plant body to stand firmly and to withstand natural hazard like strong wind and drought stress. Thus, studying the plant root phenotypes is critical for learning more about plant growing health, bidirectional influences between soil content effect and plant roots, and symbiotic relationship between root and *Rhizobia*.

However, development of root phenotyping methods severely falls behind the demands from plant researchers due to many challenges including: 1) plant roots are naturally growing in opaque soil, which makes it difficult to directly image roots; 2) unlike the stem and leaves structure of a plant that are above the ground, it is challenging to detect the complex 3-dimensional morphological patterns of underground roots; and 3) the complexity of soil environment and the softness of root body makes represent another challenge to measure roots in a non-destructive way or in situ.

To address these challenges, in recent years, researchers have developed several progressive methods that could overcome certain aspects of these challenges for plant root phenotyping. For example, growing the plants in a transparent medium (instead of opaque soils) offers the convenience for researchers to image the plant roots directly without being blocked by the opaque soil. However, the gel-based or liquid-based medium can be far from comparable with the real natural soil. As a result, plant roots could grow differently in those two mediums because of soil's differences in physical, chemical and biological characteristics. In a currently popular type of method called "minirhizotron", researchers buried transparent plastic tubes with camera or deployed several miniature cameras directly into soil, and then waited for the roots to come close enough for being imaged. Minirhizotron has the advantages that it can measure the root structure in situ and with natural soil. However, with the hard materials like plastic tubes or circuit boards buried in the soil, plant roots can be misled and redirected off their original growing paths. As a result, the root poses that the plant was intended to grow may be lost. Other most recent technologies such as X-ray Computed Tomography (X-CT) and Magnetic Resonance Imaging (MRI) can provide high resolution 3D data of the plant root structures in natural soil (19), and overcome most of the challenges described above (20). However, there are still unsolved major challenges that could prevent most of the researchers from being able to use these technologies. X-CT and MRI system typically have: 1) extremely high price for both software and hardware system, 2) large system size which makes these technologies difficult to be constructed or transported, 3) a challenge that the data quality could be dramatically influenced by the properties of soil, 4) safety-risky usage of radioactive materials in X-CT, and 5) safety-risky usage of strong magnet in MRI. Since all these methods have their unique advantages but also disadvantages, researchers are demanding a better solution that can overcome as many of these challenges.

Therefore, there is an unmet need for a novel approach that would capture images of roots of plants to provide information about their phenotypes and genotypes.

SUMMARY

A root imaging system is disclosed. The root imaging system includes a robotic arm. A camera is coupled to the robotic arm. The robotic arm is configured to insert the camera into the soil at predefined coordinates. The imaging system further includes a processor system. The processor system is configured to receive user-defined data about a plant of interest. The processor system is further configured to define insertion points about the plant of interest based on the user-defined data. The processor system is further configured to control the robotic arm to thereby insert the camera into the soil at defined insertion points, obtain images from the camera positioned at the insertion points, analyze the images for presence of roots, and identify the images having roots and combine that with image 3D location information for 3D structure reconstruction of the entire root structure.

A method of imaging plant roots is also disclosed. The method includes inserting a robotic arm at a plurality of insertion point at predefined coordinates about a plant of interest. A camera is coupled to the robotic arm. The method also includes receiving user-defined data about a plant of interest. Furthermore, the method includes defining insertion points about the plant of interest based on the user-defined data. The method also includes controlling the robotic arm to thereby insert the camera into the soil at defined insertion points. The method further includes obtaining images from the camera positioned at the insertion points. Additionally the method includes analyzing the images for presence of roots. The method, furthermore, includes identifying the images having roots. Additionally, the method include combining classification of root/no-root with image 3D location information for 3D structure reconstruction of the entire root structure.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method and system is described herein that would capture images of roots of plants and provide information about their phenotypes and genotypes. The present disclosure provides a robust approach to collect color digital images of the plant roots within the original soil environment and reconstruct a 3D structure reconstruction of the root without damaging the roots or changing their original poses, wherein the 3D structure reconstruction includes root size, width, depth, stem and branch structures, number of branches, density, stem and branch diameters, angels, curvatures, color and texture details on the surface of the root. This approach utilizes a robotic arm to hold a miniature camera and repeatedly inserting the camera into the soil to certain positions while recording frames with 3D location of each image. An algorithm automatically detects root in each image, and links this information with the 3D location of the image in the soil for reconstructing the 3D structure of the whole root. The overall system is referred to herein as 'MISIRoot'. The arrangement has been actually reduced to practice and has generated a 3D point cloud of a corn plant and collected many high-resolution 3D-positioned color images of the plant roots. The point cloud can help researchers measure the morphological features of the plant root in terms of depth, width, density distribution and so on. The roots' surface texture and their living environment in the soil can be clearly observed from the color images, as discussed below.

The root imaging system of the present disclosure operates in two modes: 1) capturing a large number of images as the robotic arm is repeatedly inserted into the soil and around the root system and takes a large quantity of color images (RGB) of the plant's roots, wherein the robotic arm includes a mini-size RGB camera; or 2) after capturing a set of images, using an optimization algorithm to control the placement of the robotic arm according to an error minimization routine. For the first part, the system records the Cartesian X, Y, and Z coordinates of the camera tip position when taking each image. All the images and coordinates data are directly saved into the computer's hard disk as Portable Network Graphic (PNG) and Comma-Separated Values (CSV) files respectively, which could be easily accessed for further processing. A software program then processes the images and their positions data to calculate various root feature results.

Figure 1A:
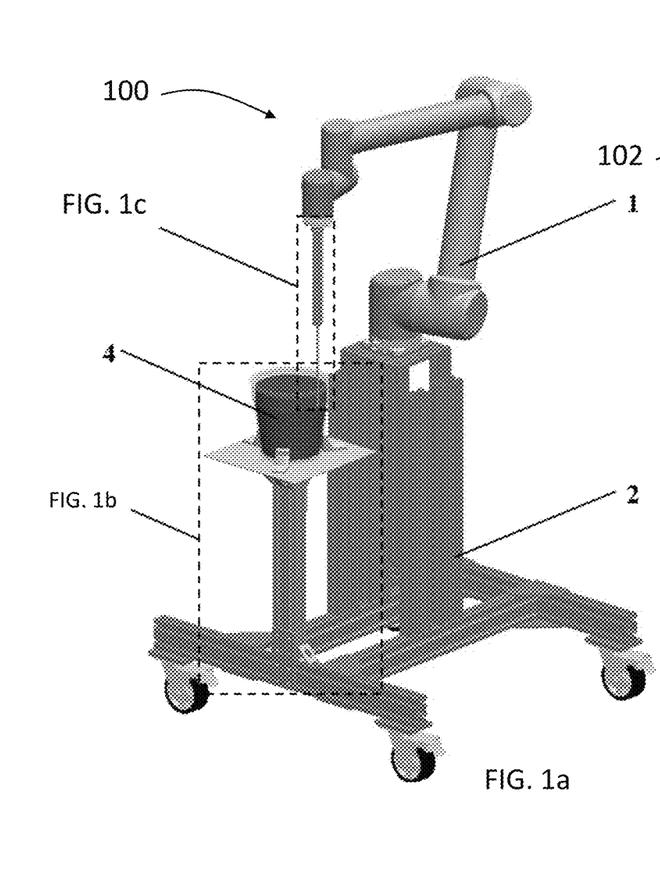
FIGS. 1a, 1b, and 1c are various views including perspective and front views of various aspects of a root imaging system according to the present disclosure are provided, including a robotic arm, a system base 2, and a platform system.
Figure 1B:
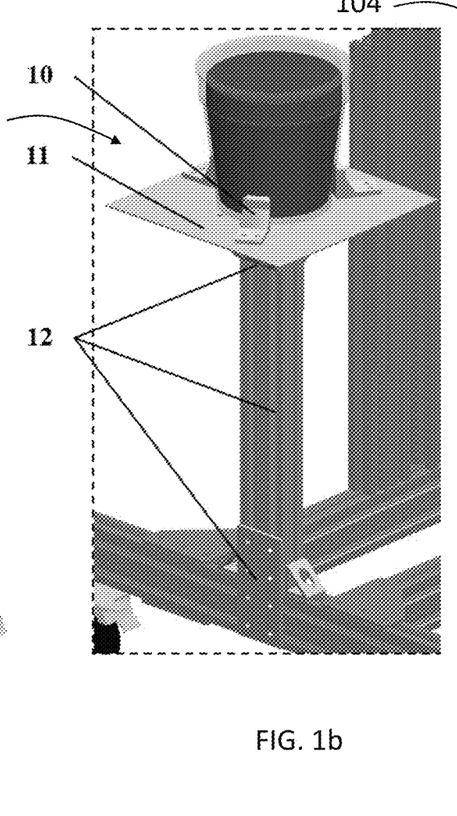
Figure 1C:
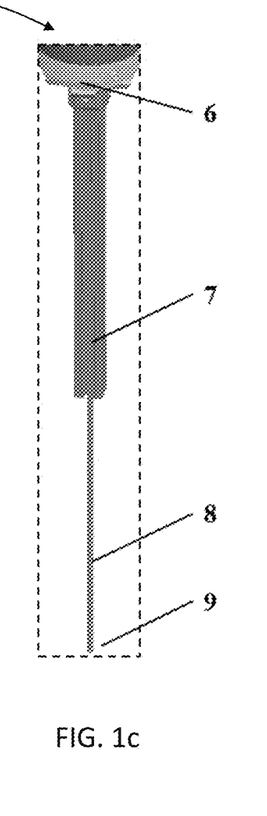

Referring to FIGS. 1a, 1b, and 1c various views including perspective and front views of various aspects of the root imaging system 100 of the present disclosure are provided. The root imaging system 100 includes a robotic arm 1 (e.g., UNIVERSAL ROBOT INC., UR10), a system base 2 (e.g., VENTION INC., e.g., with aluminum frames), and a platform system 102. The platform system 102 includes clamps 10 designed to hold in place an object (e.g., a pot), a support panel 11 designed to support an object (e.g., a pot), and support frames 12. It should be appreciated that while a pot 4 is shown, the root imaging system 100 can be deployed against other types of enclosures as well as bear ground. The root imaging system 100 also includes an imaging head system 104. The imaging head system 104 includes a mounting panel 6, a T-slot mounting frame 7, a tube 8, and an endoscope camera 9.

The root imaging system 100 is configured to capture root images of a plant in its natural setting in the soil with minimum impact to the plant's growth. According to one embodiment, the root imaging system 100 continuously takes measurements automatically by inserting a tiny camera facing vertically downwards to capture images near the plant roots. However, it should be appreciated that the camera 9 and the tube 8 are adapted to be moved in various directions including horizontal, or at an angle, e.g., 45°, while in the soil. Moving the camera 9 accordingly, allows additional capabilities to image roots at a large number of angles.

The robotic arm 1, is configured to have sufficient payload and power for holding and inserting the imaging head into soil, with sufficient movement range to cover the entire sampling region, and sufficient degrees of freedom for taking measurements at specific gestures. An example set of characteristics of the robotic arm are provided in Table 1, however, it should be understood this table is provided for example only and no limitation is intended thereby. While great detail is provided regarding the robotic arm 1 utilized herein, it should be appreciated that a number of robotic devices can be implemented each adapted to insert the camera 9 into the soil at a large number of insertion points in an automatic fashion.

TABLE 1

Exemplary Characteristics of Robotic Arm

| Specifications | values |
|---|---|
| Weight | 28.9 kg/63.7 lbs. |
| Payload | 10 kg/22 lbs. |
| Reach | 1300 mm/51.2 in |
| Join ranges | +/−360° |
| Speed | Base and shoulder: 120°/s. Elbow and wrists: 180°/s. Tool: typical 1 m/s/39.4 in/s |
| Repeatability | +/−0.1 mm/+/−0.0039 in |
| Degrees of freedom | 6 rotating joints |
| Communications | TCP/IP 100 Mbit: IEEE 802.3u, 100BASE-TX Ethernet socket & Modbus TCP |
| Programming | Universal Robots Software (PolyScope) graphical user interface on 12 in touch screen with mounting |
| International protection classification | IP54 |
| Working temperature | 0-50° C. |

As for the software, it has an accurate control system to minimize the measurement errors when the robotic arm repeatedly performs inserting and pulling actions. It has a high-frequency feedback system for sending position and counter-acting force information to the user interface, which helps the researcher record the 3D coordinates of each image and check the system's real-time status. In the root imaging system 100, a virtual boundary and a force limit is provided in the control system of the robotic arm 1 so that if the robotic arm 1 moves out of the safety range or encounters a force larger than 10 newtons, the system is emergently stopped.

Since the root imaging system 100 records the 3D coordinates of the endoscope camera 9 while taking each image, a 3D cartesian coordinate system was established. Referring to FIG. 1a, the support frame 12 is a 45 mm×90 mm T-shaped member (MCMASTER-CARR INC.), mounted firmly on the system base 2. Located at the top of the support frame 12 is a 7075-aluminum square shape support panel 11 and a set of clamps 10 designed so that an object (e.g., a plant pot) can be firmly mounted at a proper position on the support panel 11.

Figure 2:
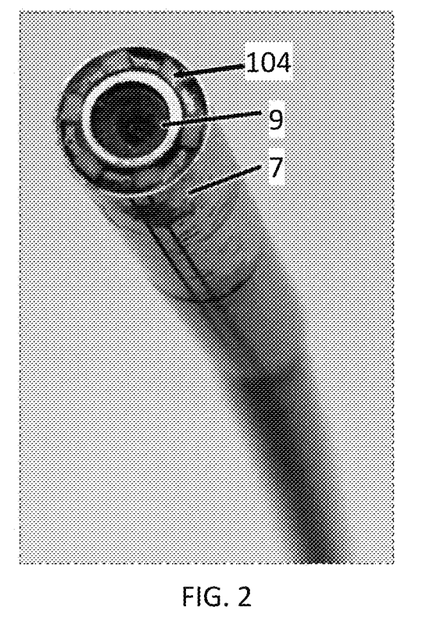
FIG. 2 is a photograph of an endoscope camera along with a tube used for insertion into soil, according to the present disclosure.

Referring to FIG. 2, a photograph of the endoscope camera 9 along with the tube 8, are provided. The cable of the endoscope camera 9 passes through the tube 8. The size (diameter) of the endoscope camera 9 is sufficiently small so that the insertion into the soil and measurements result in minimum impact on soil environment. The endoscope camera 9 has a diameter of 3.95 mm, which is comparable with the size of a typical earthworm. The endoscope camera 9 pixel resolution is 640×480, which is sufficiently clear to view plant roots in the 5 mm diameter tunnel created by the endoscope camera 9. The endoscope camera 9 is equipped with a set of 6 white Light-Emitting Diodes (LEDs), which ensures the visibility when working inside the soil. The LEDs are sufficiently bright that the exposure time can be set to lower than 1/60 seconds to avoid blurry images. Because of LEDs' characteristic of low-power-consumption, the lights do not generate significant heat and thus not cause overheating of the roots. The endoscope camera 9 is tightly wrapped with the tube 8 made from e.g., stainless-steel having an outer-diameter of, e.g., about 5 mm adapted for protecting the lens of the endoscope camera 9 when being inserted into soil. The endoscope camera 9 has a fixed focal length, a fixed aperture size and a small field of view. For an object in an image to be well focused, the distance between the object and the camera's tip should be 3 mm. Thus, if the image contains a root with clear edges, it means that the root is 3 mm away from the camera tip. As the 3D position and 3-axial directions of the tip of the endoscope camera 9 are known, the position of detected root can be calculated, accordingly. Table 2 provides information about the endoscope camera 9.

TABLE 2

Technical specifications of the endoscope camera

| Specifications | values |
|---|---|
| Total length | 2520 mm |
| Length of the metal cover | 28.3 mm |
| Camera head diameter | 3.95 ± 0.05 mm |
| Stainless-steel tube size | 4.39 mm inside diameter, 5.16 ± 0.003 mm outside diameter |
| Censor resolution | 640 × 480 pixels |
| Censor type | RGB CCD |
| Focal Length | 4 mm |
| Total power consumption | 5 V 200 mA |
| Communication protocol | USB 2.0 Serial |
| Light source | 6 × white LED |
| International protection classification | IP54 |

Figure 3:
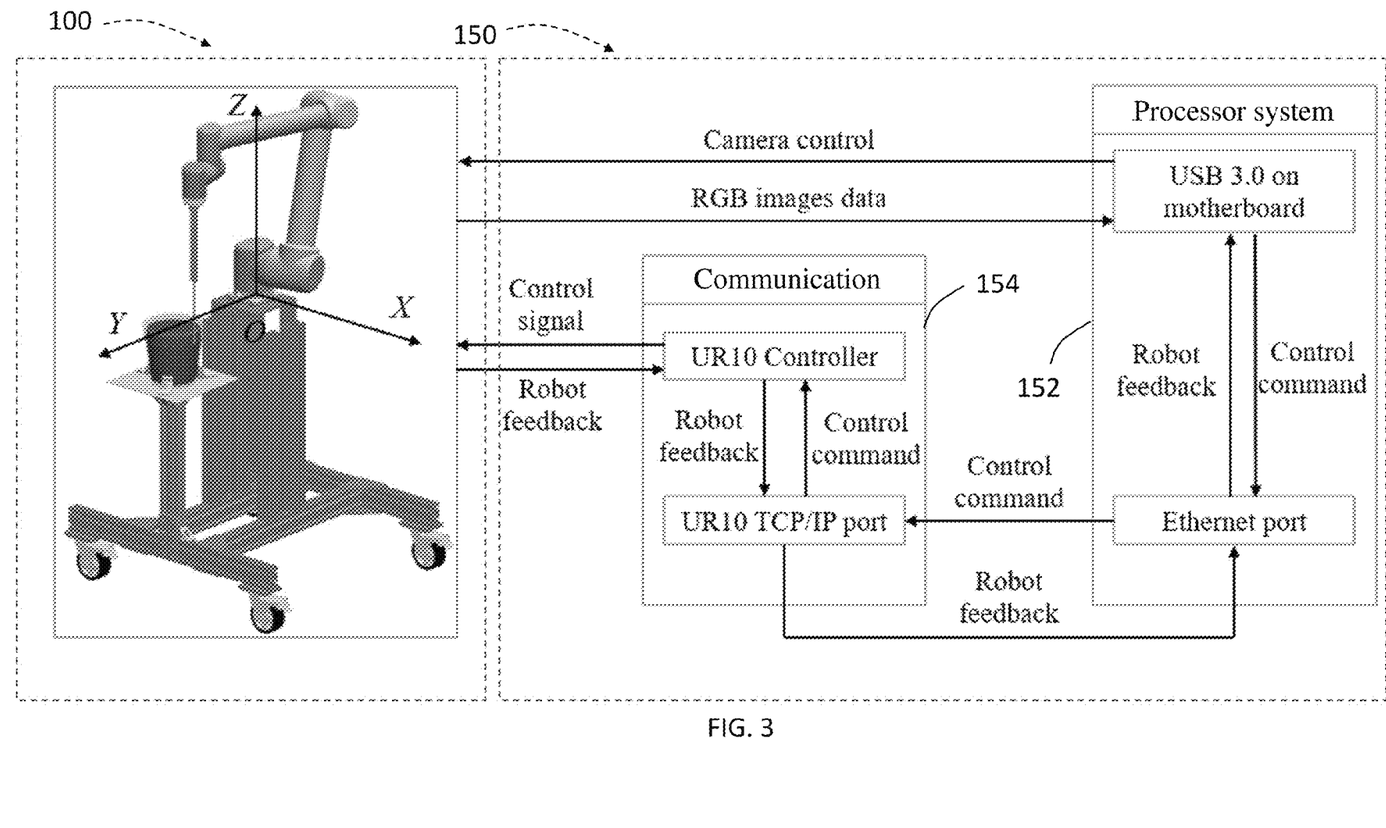
FIG. 3 is a control logic and data flow diagram showing the relationship between the root imaging system of the present disclosure and a controller.

Referring to FIG. 3, a control logic and data flow diagram is shown between the root imaging system 100 and its controller 150. The controller 150 includes a processor system 152 and a communication subsystem 154. The processor system 152 is further described with reference to FIG. 9, and is configured to control the root imaging system 100 through the communication subsystem 154. In the arrangement shown in FIG. 3, the controller 150 is configured for both sending control signals to the root imaging system 100 and receiving feedback data therefrom.

Figure 4:
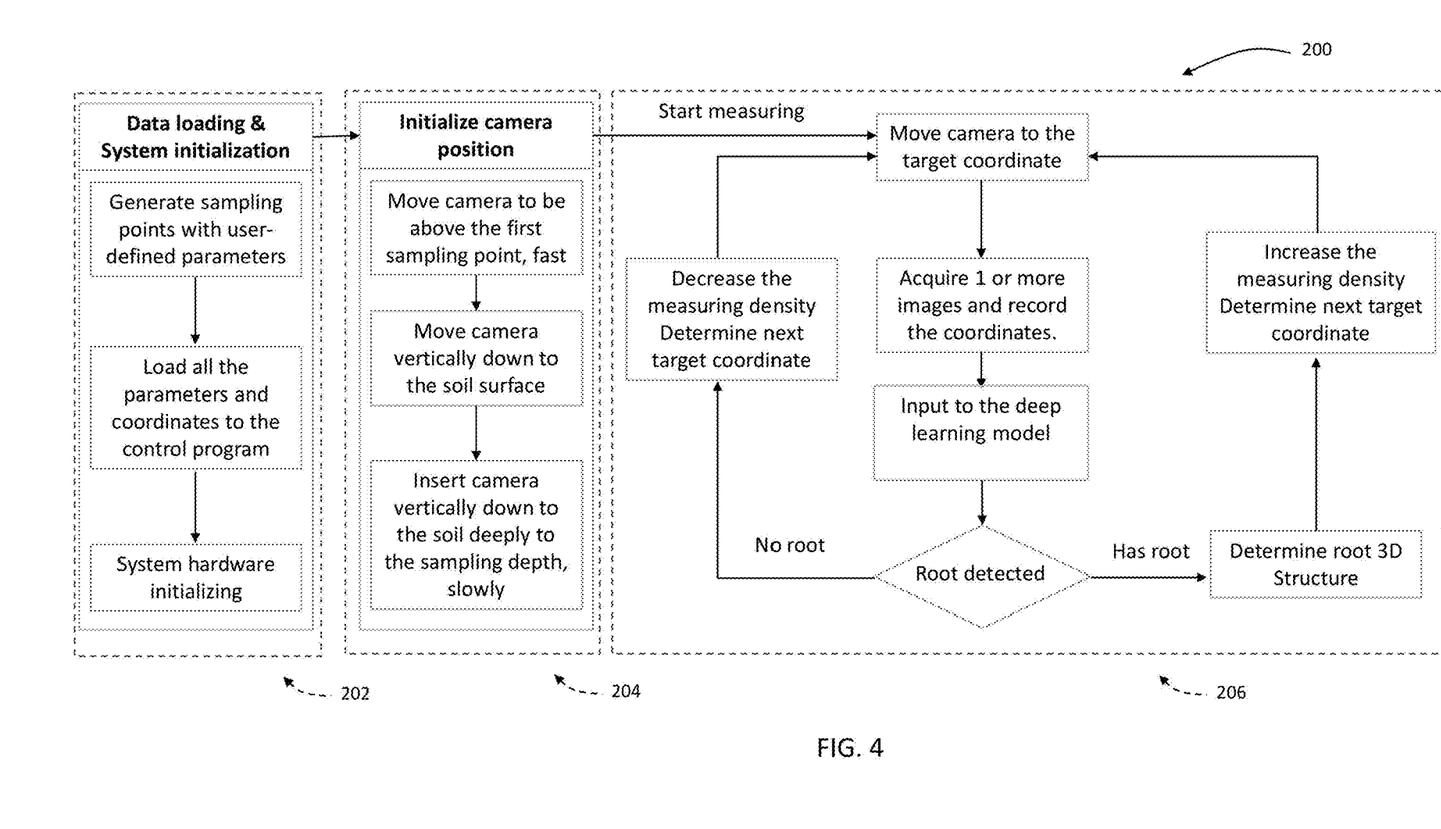
FIG. 4 is a control block diagram describing a control method for data flow between the controller and the root imaging system.
Figure 5:
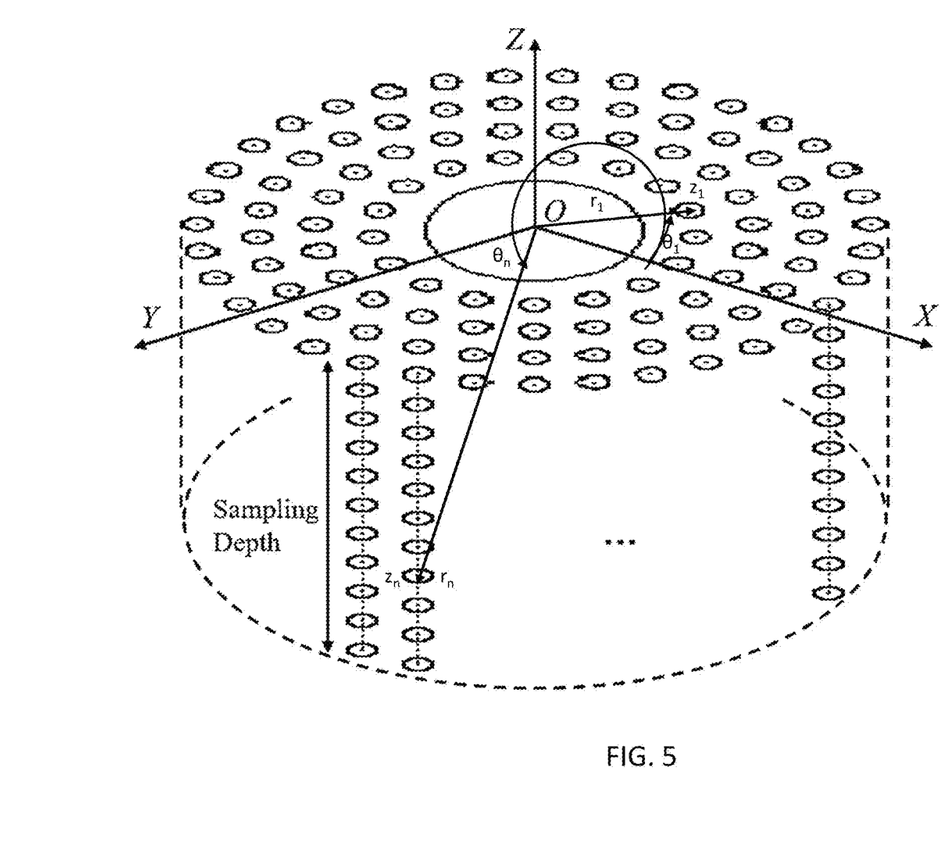
FIG. 5 is a schematic of an example data initialization utilizing a cylindrical coordinate system providing coordinates for insertion points.

Referring to FIG. 4, a control block diagram is shown describing a control method 200 for data flow between the controller 150 and the root imaging system 100. In particular, FIG. 4 shows the control flow of root imaging system 100 with dynamically adjusted path under the control of the controller 150. Method 200 is divided into three major blocks: data initialization block 202, camera position initialization block 204, and camera position control block 206. In the data initialization block 202, the controller 150 receives user defined parameters including an estimate of the root ball, diameters (inner diameter representing root stem and outer diameter representing maximum diameter, e.g., diameter of the pot), and depth, as well as other parameters such as frequency of image acquisition, and resolution. The data initialization block 202 then loads the user defined parameters and the processor system 152 calculates 3D positions of the camera based on these initial parameters. Referring to FIG. 5, a schematic of an example data initialization is shown. For example, a cylinder core is elucidated and divided into a large number of target positions. The inner and outer diameters and the depth are used to generate cylindrical coordinates ($r_i$, $\theta_i$, $z_i$) for all the possible target positions. Distance between any two adjacent positions (i.e., resolution) at the same z is determined based on the diameter of the tube 8 (see FIG. 1c), such that no adverse results are created because of too close of insertion of the tube into the soil. As a result, a cylindrical core-like volume is created based on these target positions. In FIG. 5, at each z, there are 4 radial positions (i.e., $r_1$, $r_2$, $r_3$, and $r_4$), 17 angular positions ($\theta_1$, $\theta_2$, ... $\theta_{17}$), and 11 height positions ($z_1$, $z_2$, ... $z_{11}$). Therefore, there are 748 initial target points. It should be noted that these initial target points are provided for demonstration purposes only; in certain cases, there may be thousands of initial target positions, each having their corresponding cylindrical coordinates ($r_i$, $\theta_i$, $z_i$).

According to one embodiment, the controller 150 is configured to move the camera sequentially from the first point (i.e., $r_1$, $\theta_1$, and $z_1$) to the last point (i.e., $r_n$, $\theta_m$, and $z_p$, where indexes n, m, and p represent the number of target position along each direction; in FIG. 5, n=4, m=17, and p=11). In this embodiment there is no optimization, and thus in the example shown in FIG. 5, there are 748 measurements, however, the number can be much higher based on other dimensions. This sequential progression can require a substantial amount of time. To remedy this time-consuming sequential approach, an optimization procedure is discussed below. Thus progression from a point in the sequence to the next point is referred to herein as normal sequential progression.

To ensure high throughput and reduce as much labor time as possible, the entire sampling process control is configured to be fully automatic. In the sampling process, camera is controlled to move up step by step from the bottom of each tunnel (i.e., for a $r_i$ and $\theta_i$, target positions of $z_n$ to $z_1$) and pauses for about 0.5 seconds at each viewpoint until finishing the imaging. At the same time, the controller 150 continually reads the camera position at 50 Hz of frequency to check if the camera head has arrived at the correct position. Once arriving at each sampling position, the computer captures one image and saves the image and the set of 3D coordinates into local files. After completely sampling through a tunnel, the camera is moved to the initial position above the next sampling point and the system repeats the sampling process until finishing through all the sampling points. Exceptional circumstances during the sampling process such as having too much counteracting force or moving out of safety region, will cause the system to enter the emergency-stop stage so that basic safety is ensured for automatic operation.

Referring back to FIG. 4, the data initialization block 202 then initializes hardware including the robotic arm 1. The data initialization block 202 then moves to the camera position initialization block 204. In the camera position initialization block 204, the controller 150 moves the camera on, e.g., a plane having z=0, to an initial camera target position based on the user-defined parameters received in the data initialization block 202 (i.e., to the first initial target position, $r_1$, $\theta_1$, $z_1$). The camera position initialization block 204 then moves the camera in the z direction into the soil surface, and then moves the camera to the coordinates by inserting the camera to the calculated depth (i.e., $r_1$, $\theta_1$, $z_n$). Next the method 200 moves to the camera position control block 206. In the camera position block 206, the controller 150 recursively moves the camera to a target position either based on the user-defined data or based on calculations as discussed below. At this position, the camera is moved upwards from $z_n$ to $z_1$ positions, while acquiring one or more images and record the images along with their corresponding coordinates. The reason for recording coordinates is that there may be a difference between desired target positions and actual target positions. Therefore, the actual target positions are recorded. The one or more images are then provided to deep learning module, discussed below, to determine if roots are detected. If roots are detected along one or more vertical tunnels (i.e., for a $r_i$ and $\theta_i$, target positions of $z_n$ to $z_1$), then the camera position block 206 increases measurement density (maximum measurement density is based on the initial target positions calculated in the data initialization block 202). Thereafter, the camera position block 206 determines the next target position from the list of initial target positions and drives the camera to that position. If, however, no roots are detected in one or more tunnels, then the camera position block 206 decreases measurement density (minimum measurement density is based on the initial target positions calculated in the data initialization block 202). By reducing measurement density, time can be saved because various angular positions can be skipped. For example, if θ was at the first position (i.e., $\theta_1$), and r is sequenced from $r_1$ to $r_n$, and $z_p$ to $z_1$, and no roots are detected, then the measurement density can be reduced so that the next set of measurements skip $\theta_2$ and other $\theta_i$, and move to the next θ (e.g., $\theta_3$), and so on. By doing so, all measurements for $\theta_2$ can be skipped (in FIG. 5 this represents not only 44 measurements but also time that is required to move the camera to position $\theta_2$. If however, when arriving at $\theta_3$, a high level of roots are detected above a threshold, the controller 150 may decide to backtrack to the skipped position(s) and acquire images (not shown) at those positions. Regardless, the camera position block 206 determines the next target position from the list of initial target positions in either an optimized way or based on the normal sequential approach and drives the camera to that position.

Figure 6:
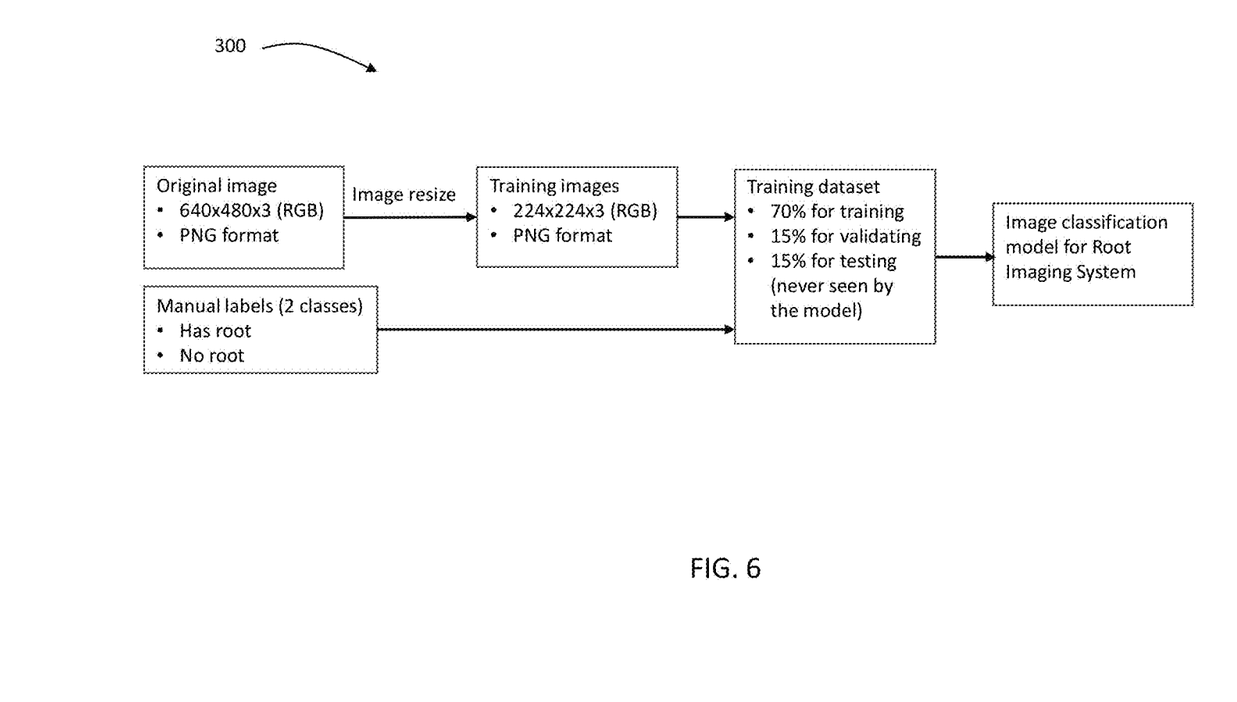
FIG. 6 is a block diagram depicting a convolutional neural network of a deep learning engine according to the present disclosure adapted to provide a root/no-root classification of a plant at different insertion points.

In order to determine whether there is root in the images, either a post-processing approach including a deep learning engine is applied to the normal sequential imagery, or the deep learning engine is applied in real time to determine data acquisition density, as described above. The deep learning engine is based on a convolutional neural network. Referring to FIG. 6 a block diagram 300 is provided depicting the convolutional neural network of the deep learning engine according to the present disclosure. According to the block diagram 300 the deep learning engine is configured to learn from a series of images with apriori determination as to whether root is present in images or not. The images are first resized from 640×480×3 (RGB) to 224×224×3(RGB), each image with a flag as to whether root is in the image or not. The data is provided as training data to a neural network. In so doing, 70% of the data is provided as training data, 15% as validation, and 15% for testing images never seen by the neural network. Once satisfied with the testing, the model is ready to receive new images and thereby determine whether there is root present or not.

The machine learning shown in FIG. 6 provides significant utility since manual classification on a large number of images costs human labor and can be extremely time consuming. Thus, the machine learning model of the present disclosure is based on a deep convolution neural network so called "Inception V3". The model was built and trained in PyTorch 0.4.1 (25) with those manually classified images. Using a computer model to process the images can dramatically reduce the labor requirement and improve the overall throughput.

Figure 7A:
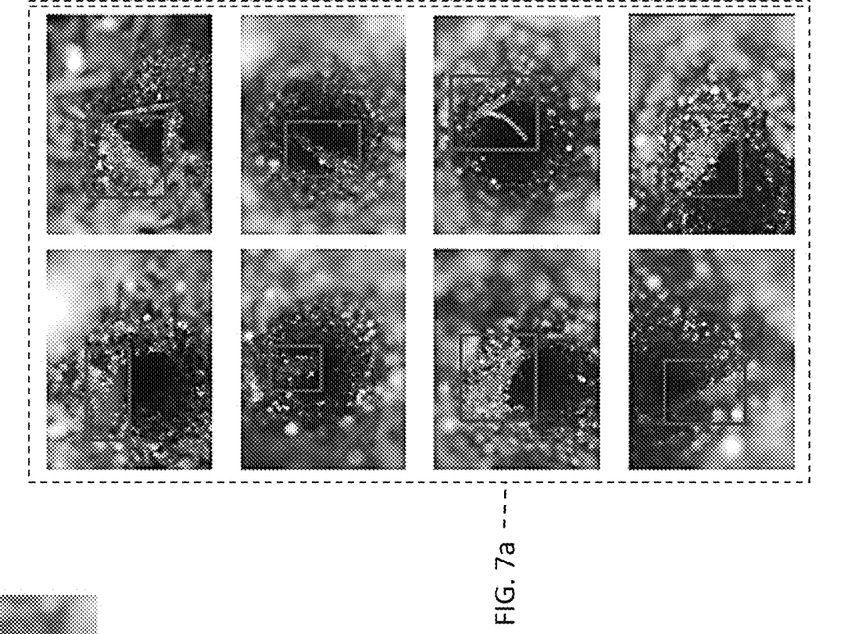
FIG. 7a is a plurality of photographs showing a plant in soil, with rectangular boxes drawn around features representing roots, thus each image is associated with a "root" classification.
Figure 7B:
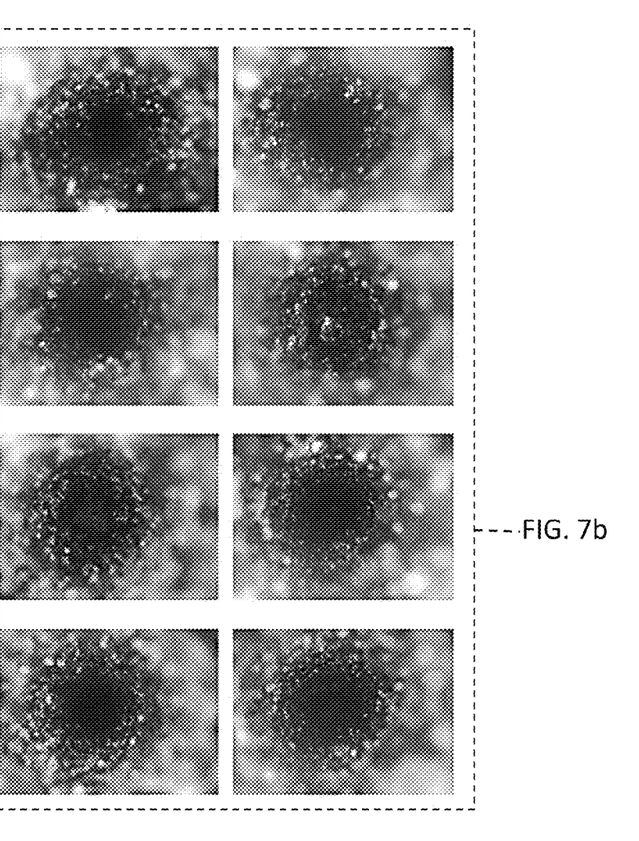
FIG. 7b is a plurality of photographs showing a plant in soil with no roots visible, thus each image is associated with a "no-root" classification.

As part of the preliminary image classification results, some example images of both classes are shown in FIGS. 7a and 7b which are photographs showing images of dirt with roots (shown in rectangular boxes of FIG. 7a and images of dirt with no roots shown in FIG. 7b). The rectangular boxes in each image indicates the view and location of a plant root. Thus according to one training scenario, the root imaging system of the present disclosure was configured to have a high sampling density which resulted in about 2 hours spent and 5125 images collected for each pot. Altogether, 92250 images were acquired during the entire experiment. After checking through all the images, a total of 788 images were manually labeled as the 'Has Root' class and were used for the further morphological analysis. In order to automate the root identification process, the manually labeled images were then used to train the deep learning engine discussed with respect to FIG. 6. Another 788 images were randomly picked from all the 'No Root' class images so that the data in both classes could be balanced in the dataset. Certain numbers of images were randomly picked from each of the two classes to form subgroups of data in the process of model development. There were 550 images for training, 119 images for validation and 119 images for testing (never seen by the model). Thereafter, with the model 108/119 (90.8%) images and 106/119 (89.1%) images in the testing dataset were correctly classified into 'Has Root' class and 'No Root' class, respectively. The processor system 152 (see FIG. 3) including a CORE-I5 CPU, and a GTX 1080 GPU, the image classification speed was about 0.05 seconds per image. This model provided an automatic, high-accuracy and fast root identification software solution.

Figure 8:
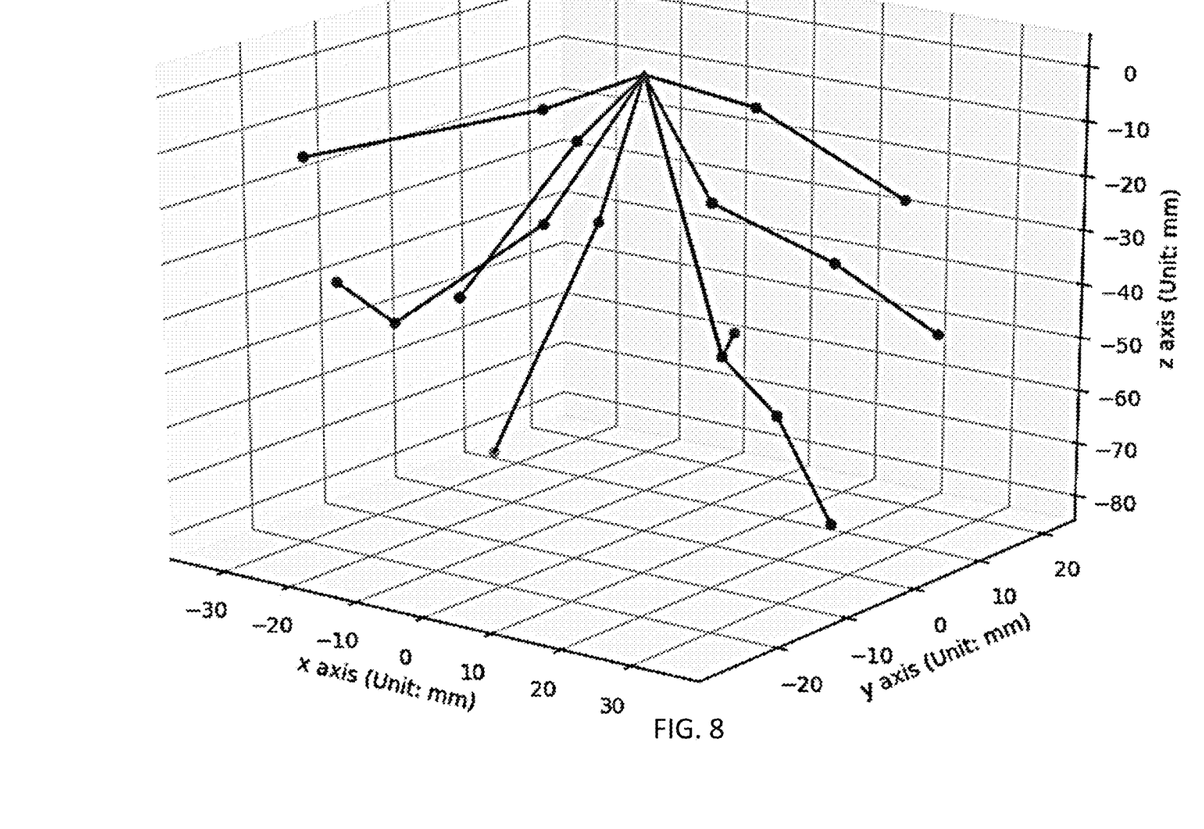
FIG. 8 is an example of a points cloud diagram generated from one plant picked from a drought-stressed plant grouping.

An example 3D reconstruction of the root system is provided in FIG. 8, which is an example of the points cloud generated from one plant picked from a drought-stressed plant grouping. The triangle at the top indicates seed location in the soil; dots indicate positions at which a root was found; and lines connected between dots indicate root connections. The validity of the 3D points cloud and 3D reconstruction results were proved by their ability of clearly differentiating the roots from different watering treatments: The calculated root size and depth results from the root imaging system of the present disclosure showed significant differences between the watering treatments. More specifically, a preliminary analysis was conducted based on the depth distribution of those points clouds. Point cloud distribution along the Z axis was analyzed. The average root depth increased with the growing of plant in the drought-stressed group but remains almost the same in the well-watered group. This analysis showed that the roots in the drought stress condition were trying to grow deeper to increase their chances to survive and the roots that had enough water tend to accumulate in a relatively shallower region.

Figure 9:
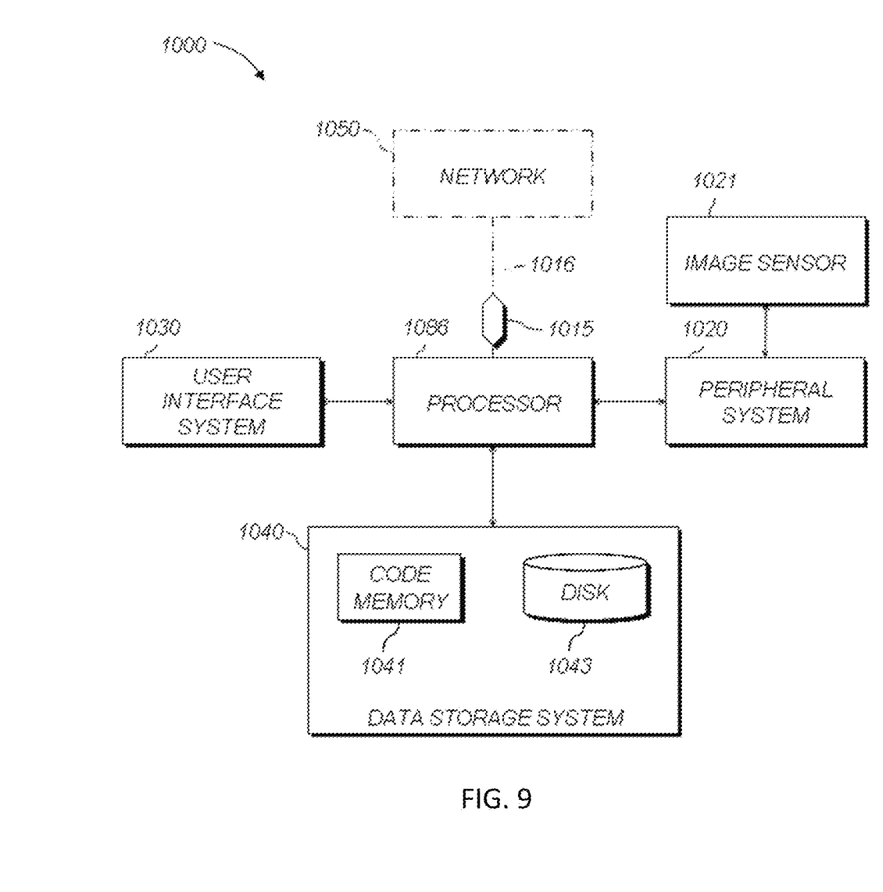
FIG. 9 is a schematic of an example of a computer system that can take the place of the processor system or cooperate in connection therewith and can interface with the root imaging system of the present disclosure.

Referring to FIG. 9, an example of a computer system that can take the place of the processor system 152 or cooperate in connection therewith is provided that can interface with the above-discussed root imaging system 100 of the present disclosure. Referring to FIG. 9, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. A root imaging system, comprising:
a robotic arm;
a camera coupled to the robotic arm, the robotic arm configured to insert the camera into soil at predefined coordinates;
a processor system configured to
receive user-defined data about a plant of interest,
define insertion points about the plant of interest based on the user-defined data,
control the robotic arm to thereby insert the camera into the soil at defined insertion points,
obtain images from the camera positioned at the insertion points associated with image 3D location information,
analyze the images for presence of roots, and
identify the images having roots and combine that with image 3D location information for 3D structure reconstruction of the entire root structure.

2. The root imaging system of claim 1, the user-defined data includes stem diameter, a maximum diameter, and a depth of the root.

3. The root imaging system of claim 2, the insertion points are defined based on a minimum resolution between two adjacent insertion points based on diameter of the camera.

4. The root imaging system of claim 3, the minimum resolution between two adjacent insertion points is 2 times the camera diameter.

5. The root imaging system of claim 4, the insertion points are defined based on a cylindrical coordinate system having r, $\theta$, and z as coordinate elements, wherein the origin of the coordinate system is at the center of the stem diameter at the surface of the plant.

6. The root imaging system of claim 5, wherein the insertion points range from $P_1$ ($r_1$, $\theta_1$, $z_1$) to $P_n$ ($r_n$, $\theta_n$, $z_n$), wherein $r_1$ represents smallest radius, $\theta_1$ has the closest angular relationship to $\theta=0$, $z_1$ represents closest distance to the origin on the z-axis, $r_n$ represents largest radius, $\theta_n$ has the largest angular relationship to $\theta=0$, and $z_n$ represents farthest vertical distance to the origin on the z-axis.

7. The root imaging system of claim 6, wherein the insertion points are sequentially divided between $P_1$ and $P_n$ at a first density, wherein the first density represents sequential progression of each vertical tunnel, a vertical tunnel is defined as a set of insertion points for a given $r_1$ and $\theta_1$ while z varies between $z_n$ to $z_1$.

8. The root imaging system of claim 7, analysis of the image is performed by a convolutional neural network trained based on a plurality of images with root/no-root classification for each training image, whereby input to the convolutional neural network is an image and output is a classification of root vs. no-root.

9. The root imaging system of claim 8, if in real time for a $\theta_i$ all images of all vertical tunnels having $r_i = r_1$ to $r_n$ and $z_i = z_1$ to $z_n$ analyzed by the convolutional neural network result in no-root classifications for all images at each such insertion point, next vertical tunnels at $\theta_{i+1}$ are skipped.

10. The root imaging system of claim 9, wherein if vertical tunnels at $\theta_{i+1}$ are skipped and vertical tunnels at $\theta_{i+2}$ provide an average count for root classifications above a predetermined threshold, the robotic arm is reversed back to vertical tunnels to $\theta_{i+1}$.

11. A method of imaging plant roots, comprising:
inserting a robotic arm at a plurality of insertion point about a plant of interest at predefined coordinates, a camera coupled to the robotic arm;
receiving user-defined data about a plant of interest;
defining insertion points about the plant of interest based on the user-defined data;
controlling the robotic arm to thereby insert the camera into soil at defined insertion points;
obtaining images from the camera positioned at the insertion points associated with image 3D location information,
analyzing the images for presence of roots; and
identifying the images having roots and combine that with image 3D location information for 3D structure reconstruction of the entire root structure.

12. The method of claim 11, the user-defined data includes stem diameter, a maximum diameter, and a depth of the root.

13. The method of claim 12, the insertion points are defined based on a minimum resolution between two adjacent insertion points based on diameter of the camera.

14. The method of claim 13, the minimum resolution between two adjacent insertion points is 2 times the camera diameter.

15. The method of claim 14, the insertion points are defined based on a cylindrical coordinate system having r, $\theta$, and z as coordinate elements, wherein the origin of the coordinate system is at the center of the stem diameter at the surface of the plant.

16. The method of claim 15, wherein the insertion points range from $P_1$ ($r_1$, $\theta_1$, $z_1$) to $P_n$ ($r_n$, $\theta_n$, $z_n$), wherein $r_1$ represents smallest radius, $\theta_1$ has the closest angular relationship to $\theta=0$, $z_1$ represents closest distance to the origin on the z-axis, $r_n$ represents largest radius, $\theta_n$ has the largest angular relationship to $\theta=0$, and $z_n$ represents farthest vertical distance to the origin on the z-axis.

17. The method of claim 16, wherein the insertion points are sequentially divided between $P_1$ and $P_n$ at a first density, wherein the first density represents sequential progression of each vertical tunnel, a vertical tunnel is defined as a set of insertion points for a given $r_i$ and $\theta_i$ while z varies between $z_n$ to $z_1$.

18. The method of claim 17, analysis of the image is performed by a convolutional neural network trained based on a plurality of images with root/no-root classification for each training image, whereby input to the convolutional neural network is an image and output is a classification of root vs. no-root.

19. The method of claim 18, if in real time for a $\theta_i$ all images of all vertical tunnels having $r_i=r_1$ to $r_n$ and $z_i=z_1$ to $z_n$ analyzed by the convolutional neural network result in no-root classifications for all images at each such insertion point, next vertical tunnels at $\theta_{i+1}$ are skipped.

20. The method of claim 19, wherein if vertical tunnels at $\theta_{i+1}$ are skipped and vertical tunnels at $\theta_{i+2}$ provide an average count for root classifications above a predetermined threshold, the robotic arm is reversed back to vertical tunnels to $\theta_{i+1}$.

* * * * *